United States Patent

Zitz et al.

[11] Patent Number: 5,881,832
[45] Date of Patent: *Mar. 16, 1999

[54] METHOD OF CONTROLLING INTERLINKED VEHICLES IN MINING AND TUNNELLING AS WELL AS ARRANGEMENT FOR CARRYING OUT THIS METHOD

[75] Inventors: Alfred Zitz, Zeltweg; Nikolaus August Sifferlinger, St. Stefan, both of Austria

[73] Assignee: Voest-Alpine Bergtechnik Gesellschaft GmbH, Zeltweg, Austria

[*] Notice: This patent issued on a continued prosecution application filed under 37 CFR 1.53(d), and is subject to the twenty year patent term provisions of 35 U.S.C. 154(a)(2).

[21] Appl. No.: 512,866

[22] Filed: Aug. 8, 1995

[30] Foreign Application Priority Data

Aug. 16, 1994 [AT] Austria ..................... 1586/94

[51] Int. Cl.$^6$ .................................................. B62D 1/28
[52] U.S. Cl. ............................................. 180/169; 701/26
[58] Field of Search ................ 104/138.1; 414/339, 414/343, 694; 180/167, 168, 169; 364/424.031

[56] References Cited

U.S. PATENT DOCUMENTS

| | | | |
|---|---|---|---|
| 4,069,888 | 1/1978 | Wolters et al. | 180/169 |
| 4,413,210 | 11/1983 | Gronau | 180/169 |
| 4,465,155 | 8/1984 | Collins | 180/169 |
| 4,942,531 | 7/1990 | Hainsworth et al. | 180/167 |
| 4,957,405 | 9/1990 | Roberts et al. | 414/339 |
| 5,174,211 | 12/1992 | Snead | 414/339 |
| 5,244,337 | 9/1993 | Stenger | 414/694 |
| 5,572,484 | 11/1996 | Gaus et al. | 180/167 |
| 5,734,336 | 3/1998 | Smithline | 180/169 |

FOREIGN PATENT DOCUMENTS

| | | | |
|---|---|---|---|
| 37 33 533 | 4/1989 | Germany . | |
| 198172 | 12/1982 | Japan | 180/167 |
| 62-285112 | 12/1987 | Japan | 364/424.031 |
| 282616 | 11/1989 | Japan | 180/167 |

OTHER PUBLICATIONS

Translation document PTO 98–2331, of Japanese Patent document 282–616 to Kazutoshi Tani, Nov. 1989.

*Primary Examiner*—J. J. Swann
*Assistant Examiner*—Frank Vanaman
*Attorney, Agent, or Firm*—Pillsbury Madison & Sutro LLP

[57] ABSTRACT

A method of controlling interlinked vehicles in mining and tunnelling operations with at least one of the vehicles having a travelling mechanism is disclosed. Distance measurements to adjacent wall surfaces which define a path of movement are taken on opposite sides of the vehicles, and on each side at least two ultrasonic sensors are arranged to be offset in the direction of movement in determining the distances. Signalling lines of the sensors are fed to an evaluation and control circuit via vehicle couplings. The control circuit is formed by an autoadaptive learning microcomputer.

5 Claims, 2 Drawing Sheets

METHOD OF CONTROLLING INTERLINKED VEHICLES IN MINING AND TUNNELLING AS WELL AS ARRANGEMENT FOR CARRYING OUT THIS METHOD

BACKGROUND OF THE INVENTION

1. Field of the Invention The invention relates to a method and apparatus for interlinked vehicles in mining and tunnelling with at least one of the vehicles having a travelling control mechanism.

2. Prior Art

Curve conveyors that are moveable in their longitudinal directions, such as curve-traversing chain scraper conveyors, are known for instance from DE-A1-39 05 802. In this known arrangement, a guide beam comprise of an articulated beam carried by the conveyor guides the curve conveyor in the desired course as the latter moves forward. From DE-A1-42 19 098 an arrangement is known in which tracking rails or grooves are provided at least in curved regions. The precise alignment in the path of movement in that case is monitored by means of a pulse generator and pulse receivers, the pulse generator having to be stationarily fixes at a previously determined point in the path in a respectively defined manner. Readjustment is necessary at each transfer of the pulse generator.

SUMMARY OF THE INVENTION

The present invention aims at simplifying the navigation of interlined vehicles in mining and tunnelling operations and enabling the control of the vehicles without requiring any measures involving the path itself. In particular, the invention aims at avoiding expensive adjustment work in the path, and it renders feasible an autonomous control without constantly resorting to a laser means. To achieve this objective, the method according to the invention essentially consists in distance measurements to adjacent lateral faces of the tunnel being taken on opposite side of the vehicles using transmitters and receivers, the measured values being used for aligning the direction of movement of the vehicles on the path or in the tunnel. With information on direction and position being effected autonomously by transmitters and receivers on the interlined vehicles and by evaluation of the respective distance measuring signals, the use of expensive means in the track can be obviated. The method may be realized in a particularly simple manner in that on opposites sides of each vehicle, at least two ultrasonic sensors, arranged to be offset in the direction of movement, are employed for the determinations of distance. If two ultrasonic sensors are provided on each side of each vehicle and they are offset in the direction of movement, obstacles, miners passing by or lateral excavations in the tunnel may readily be averaged out while nevertheless obtaining an altogether useful control signal, excessive deviations being averaged and filtered out. Advantageously, the method is carried out in that the measured values are periodically interrogated and averaged out while filtering out measured values whose deviation from the preceding measured value exceeds a threshold value. In this manner, measuring errors that might be caused by persons or objects in the measuring path are extracted, it being not at all necessary for each sensor to continuously make available a valid measuring signal. The use of ultrasonic sensors, in particular, offers the advantage that the signals are largely reproducible even at a high dust load, yielding a high degree of accuracy for direction control.

Naturally, inaccuracies in the progression of lateral faces and excavation accordingly bring about inaccuracies in direction control. However, such an error is statistical, being largely averaged out from one vehicle to another if the sensors on the vehicles have appropriate interspaces in the longitudinal direction. Advantageously, the arrangement according to the invention for carrying out the method, therefore, is devised in a manner such that at least two ultrasonic sensors are arranged on each side of the vehicles, and they are interspaced in the longitudinal direction of the vehicle so as to be unequal to the excavation depth of the excavation tool of a multiple thereof. By choosing the interspacing in such a way the accumulation of errors can be prevented, the advantage of statistical averaging out again is achieved.

The measuring signals can be processed in an intelligent manner, an increase in the accuracy of the navigation system being readily feasible by determining deviations of the lateral face progression during the advance of the vehicles or calibrating constant errors in a calibration procedure relative to a laser. Advantageously, the arrangement is configured such that couplings for the signalling lines of the sensors of neighboring vehicles are provided, the signalling lines of a plurality of vehicles being fed to an evaluation and control circuit. By such interlinking it is possible to measure the progression of the wall line during movement and to preset a mean value.

It is possible to estimate distances to tunnel timbering and walling arcs during movement, and errors relating to timbering and walling features can readily be eliminated upon knowledge of such fault sources. Finally, there is the opportunity of recorrecting the mean error after adjustment procedures relative to a laser.

In a chain of automotive transport vehicles, such as is used, e.g., in a haulage installation, navigation over a given distance may be effected via measurement of the distance to the side wall, i.e., to the lateral face or lateral wall of the path through which the vehicles move, the direction being preset by the first and last vehicles and the individual intermediate vehicles being moved in a predetermined path by measurement of the distance to the side wall via a memorizing and adaptive system. Advantageously, the configuration is devised such that with a plurality of interlinked vehicles having self-contained motor drives, especially, in haulage installations, the direction of the first and last vehicles in input to the control as a preset value for the orientation of the individual intermediate vehicles, wherein, in a particularly simple manner, the control comprises a logic circuit for filtering out discretely changing measured distance values. Such filtering out permits the simple elimination of sensors that do not furnish suitable signals, which may be the case, for instance, with coverings or excavations or crosscuts in the path, the control getting its information from the closest-neighboring sensor emitting a valid signal. In order to ensure the appropriate adjustment of movement and thus the necessary corrections in navigation, the arrangement advantageously is devised such that individual vehicles each include a control mechanism for providing lateral corrections the direction of movement.

Measurement of the distance to the side wall or lateral wall may be effected in an optical, electromagnetic or acoustic manner but preferably by ultrasonic sensors.

Advantageously, the control circuit is comprised of an autoadaptive learning microcomputer thereby rendering feasible the disconnection of individual elements of the vehicle chain and their displacement to another region. In that case, the first transport element must be controlled wherein the subsequent elements again are able to follow the same moving line. On the whole, an adaptive system provides for the precise orientation of the position and direction of an advance working machine as well as the simple control of interlinked vehicles by the evaluation of sensor signals in a microprocessor. A direct connection to navigation and direction controlling means within the path is not required, since the orientation can directly be derived from the progression of movement.

BRIEF DESCRIPTION OF THE DRAWINGS

In the following, the invention will be explained in more detail by way of exemplary embodiments schematically illustrated in the drawing, wherein.

DETAILED DESCRIPTION OF PREFERRED EMBODIMENTS OF THE INVENTION

Figure 1:
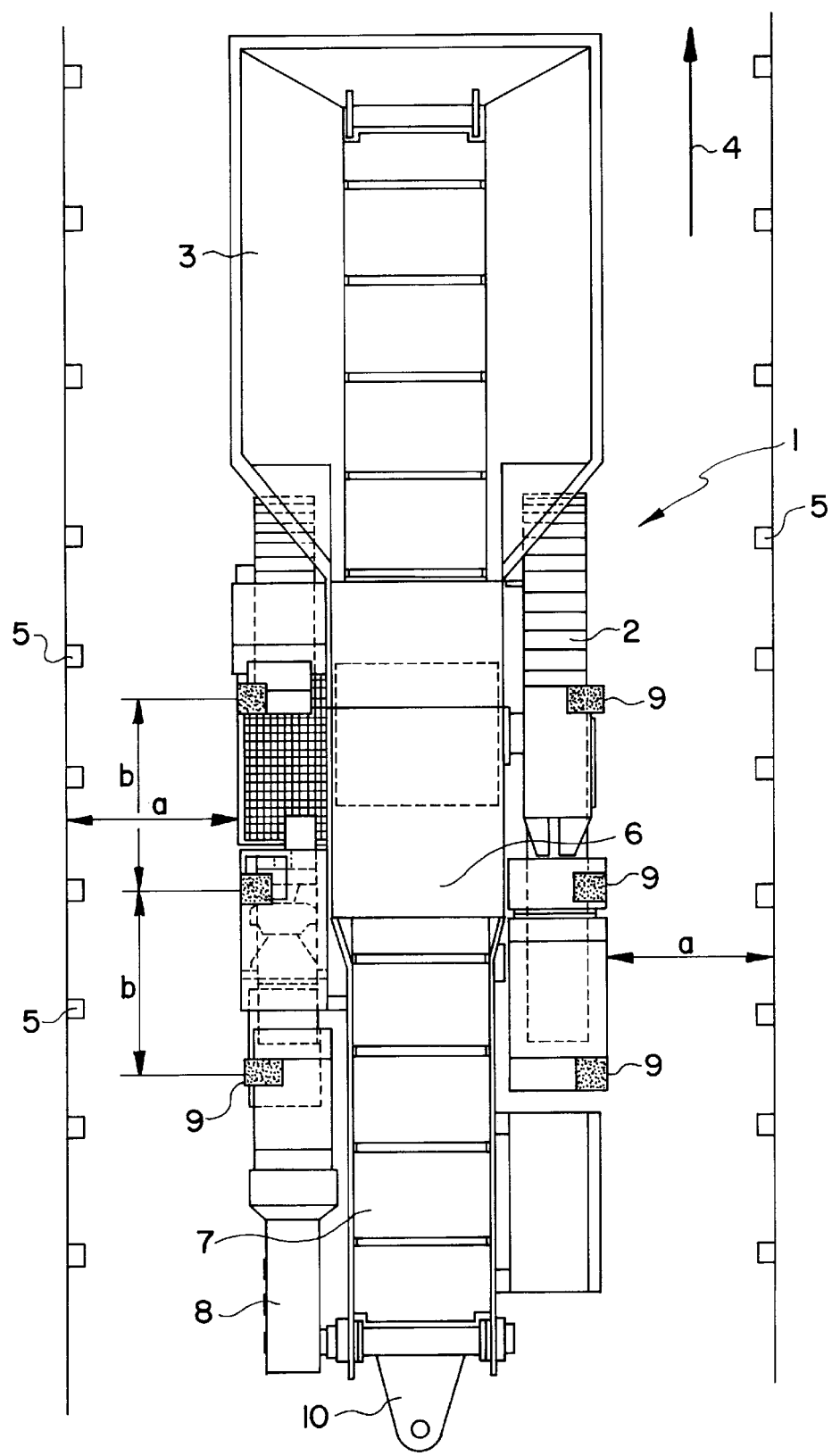
FIG. 1 is a top view on a vehicle having a self-contained motor drive and on which a conveying belt is supported.

FIG. 1 depicts a vehicle 1 comprising a travelling mechanism formed by crawlers 2. A loading chute 3 is provided, onto which the material to be conveyed off may be charged.

In the track a conventional navigation aid in the form of a laser beam 4 is schematically indicated. In the side wall regions, the track is secured by timbering and walling strut elements 5.

On the machine frame 6 of the vehicle 1 there rests a conveying belt or a chain conveyor 7 whose drive is schematically indicated by 8.

On the machine frame 6 a plurality of sensors 9 are visible, three such sensors 9 each being arranged on each side of the cutting machine. The sensors 9 are devised as ultrasonic transmitters and receivers, measuring the respective distance a to the adjacent lateral wall or lateral face of a tunnel. From a plurality of such values measured during the advance movement of vehicle 1, a calculated command variable for the moving course and the advance direction results such that a constant comparison to the laser beam 4 may be omitted. By the fact that the distance b between neighboring sensors is chosen to be unequal to the distance of struts 5 intended to secure the lateral walls and is unequal to the excavation depth of a cutting tool (not illustrated), deviations, in distance measurements as they are caused by such obstacles or by the progression of the rock in the lateral face region are averaged out thereby determining a sufficiently accurate mean moving direction in relation to a given moving direction.

Figure 2:
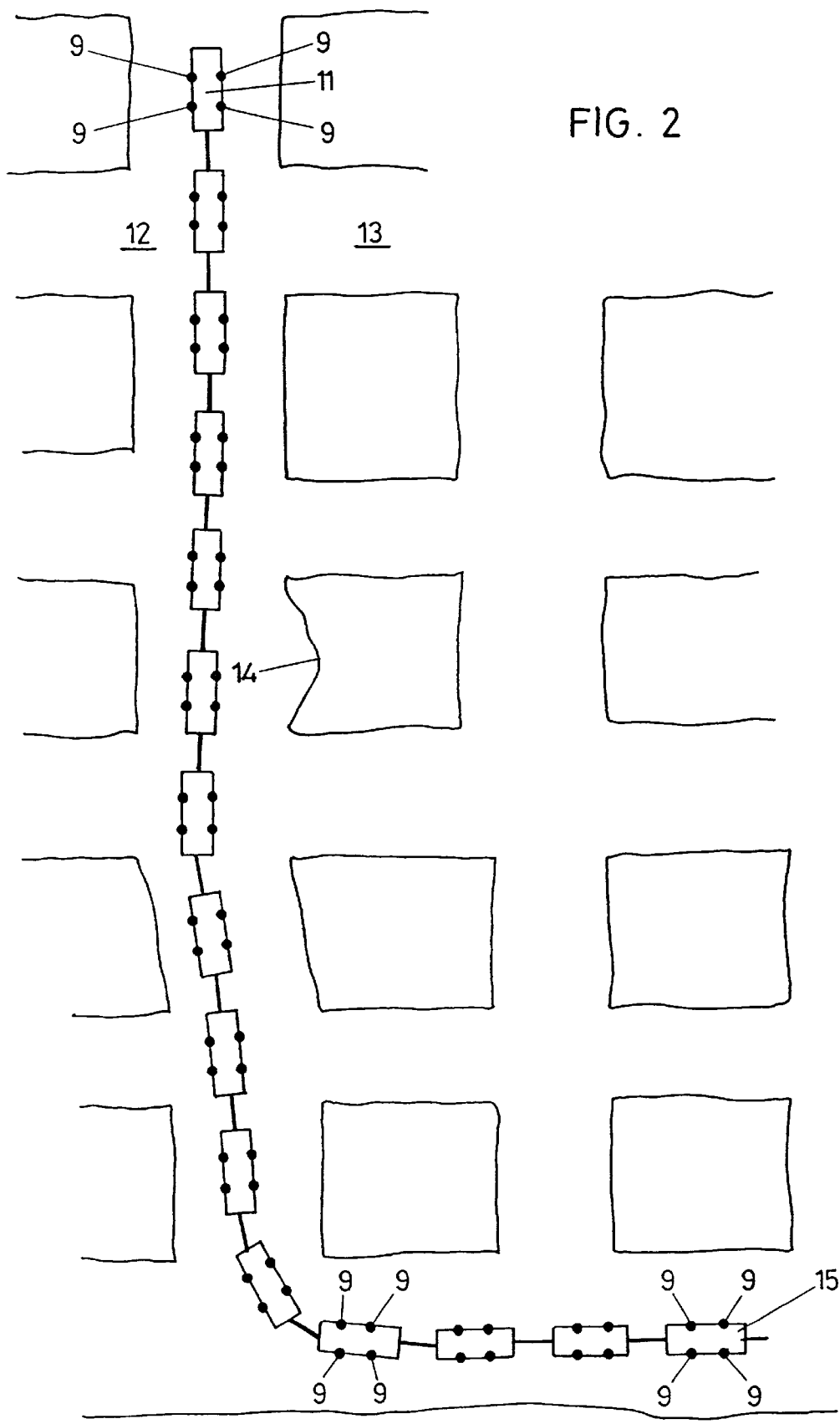
FIG. 2 is a top view on an interlinked conveying means comprising a plurality of vehicles each having its own travelling mechanism.

On the rear end of the vehicle a coupling 10 is provided. Using couplings 10, a plurality of vehicles, as illustrated in FIG. 2, are interlinked, the illustration of FIG. 2 showing a plurality of interlinked vehicles, as illustrated in FIG. 2, are interlinked, the illustration of FIG. 2 showing a plurality of interlinked vehicles 11 within a track 12. The path 12 is not straight and it has transverse excavations 13 as well as irregular excavations 14. Each vehicle 11 on opposite sides thereof has at least two sensors 9 thereby rendering feasible the precise tracing of the respectively used path by interlinking the respective signals and the automatic sequence control of consecutive vehicles as far as to the last vehicle 15 within the chain.

What I claim is:

1. A method of controlling the direction of a plurality of interlinked vehicles moving as a single unit in a path defined between spaced wall surfaces, each of said vehicles having a controllable traveling mechanism, comprising:

carrying out measurements of distance laterally to adjacent wall surfaces from each side of said plurality of interlinked vehicles from positions on said vehicles offset in the direction of movement of said vehicles using transmitting and receiving means so as to obtain measured distance values;

providing a threshold value for said measured distance values;

periodically interrogating and averaging out said measured distance values obtained while said transmitting and receiving means are positioned between spaced wall surfaces;

filtering out measured distance values, obtained while said transmitting and receiving means are positioned between spaced wall surfaces, which deviate from the preceding one of said measured distance values by a value exceeding said threshold value; and dependent on the direction of movement of said interlinked vehicles, using the remaining unfiltered measured distance values and a preset value, which value is derived from at least the first of the plurality of vehicles as it moves in said direction and which is representative of said direction, for operating the traveling mechanisms of each of said vehicles to align said direction of movement of said vehicles in said path.

2. A method as set forth in claim 1, wherein said transmitting and receiving means comprises at least two ultrasonic sensors arranged on each side of said vehicle the sensors being offset in said direction of movement.

3. An arrangement for controlling the direction of a plurality of interlinked vehicles moving as a single unit in a path defined between spaced wall surfaces supported by struts, each of said vehicles having a controllable traveling mechanism, comprising:

at least two ultrasonic sensors mounted in interspaced relationships relative to each other in the longitudinal direction of said vehicles on each side of said plurality of vehicles for carrying out measurements of distance laterally to adjacent wall surfaces from each side of said vehicles, the spacing between said interspaced sensors being unequal to the separation between adjacent struts which support said wall surfaces; and signaling lines for connecting said sensors to an evaluation and control circuit, said circuit including a filter for filtering out measured distance values exceeding a threshold value and obtained while said sensors are positioned adjacent to said wall surfaces, the moving direction of at least the first of said plurality of vehicles being input to said circuit as a preset value, said circuit producing an output used for controlling the operation of the traveling mechanisms of each of said vehicles.

4. An arrangement as set forth in claim 3, wherein said evaluation and control circuit comprises a logic circuit adapted to filter out discretely changing measured distance values.

5. An arrangement as set forth in claim 3, wherein said evaluation and control circuit comprises an autoadaptive learning microcomputer.

* * * * *